(12) United States Patent
Ta et al.

(10) Patent No.: US 11,328,235 B1
(45) Date of Patent: May 10, 2022

(54) PROFESSIONAL-TEAM-BUILDER SYSTEM

(71) Applicant: Wells Fargo Bank, N.A., San Francisco, CA (US)

(72) Inventors: Kimberly C. Ta, Saint Louis, MO (US); Brian K. Osborn, Maryville, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/985,867

(22) Filed: Aug. 5, 2020

(51) Int. Cl.
*G06F 3/0482* (2013.01)
*G06Q 10/06* (2012.01)
*G06F 16/9536* (2019.01)
*G06F 16/9535* (2019.01)

(52) U.S. Cl.
CPC ... *G06Q 10/063114* (2013.01); *G06F 3/0482* (2013.01); *G06F 16/9535* (2019.01); *G06F 16/9536* (2019.01)

(58) Field of Classification Search
None
See application file for complete search history.

(56) References Cited

U.S. PATENT DOCUMENTS

| | | | |
|---|---|---|---|
| 5,819,263 A | 10/1998 | Bromley et al. | |
| 5,918,217 A | 6/1999 | Maggioncalda et al. | |
| 7,848,984 B1 | 12/2010 | Robb | |
| 8,321,310 B1 | 11/2012 | Keld et al. | |
| 8,606,678 B2 | 12/2013 | Jackowitz et al. | |
| 10,776,758 B1 * | 9/2020 | Benedict | G06Q 10/1053 |
| 2011/0113084 A1 * | 5/2011 | Ramnani | H04W 4/16 |
| | | | 709/201 |
| 2013/0036073 A1 | 2/2013 | Kiger | |
| 2013/0046704 A1 * | 2/2013 | Patwa | G06F 16/9535 |
| | | | 705/321 |
| 2013/0217365 A1 * | 8/2013 | Ramnani | H04L 67/306 |
| | | | 455/414.1 |
| 2014/0006977 A1 * | 1/2014 | Adams | H04L 12/1818 |
| | | | 715/758 |
| 2014/0019880 A1 * | 1/2014 | Kucera | H04L 51/32 |
| | | | 715/753 |
| 2015/0073959 A1 | 3/2015 | Connors et al. | |
| 2017/0154308 A1 * | 6/2017 | Duerr | G06F 16/9535 |
| 2019/0130000 A1 * | 5/2019 | Balaga | G06F 16/24542 |
| 2021/0240923 A1 * | 8/2021 | Martinov | G06F 40/174 |

* cited by examiner

*Primary Examiner* — Linda Huynh
(74) *Attorney, Agent, or Firm* — Schwegman Lundberg & Woessner, P.A.

(57) ABSTRACT

A professional-team-builder system determines whether a user, who is a team-building-eligible professional from among a plurality of team-building-eligible professionals, is opted in or opted out for participation in a team-building function of the system. If the user is opted in, the system displays, via a user interface, an opted-in interface, which includes a search interface having a plurality of search-criteria fields. The system receives search-criteria input via the search interface, and then retrieves at least one profile matching that input. Each retrieved profile corresponds to an opted-in and team-building-eligible professional that is a potential teammate of the user for a professional-services team. The system displays, via the user interface, one or more retrieved profiles. If, however, the user is opted out, the system displays, via the user interface, an opted-out interface, which includes a create-profile element, an update-profile element, and/or an opt-in element.

17 Claims, 11 Drawing Sheets

PROFESSIONAL-TEAM-BUILDER SYSTEM

TECHNICAL FIELD

The present disclosure relates to digital communication, user interfaces, databases, and enterprise software, and more particularly to systems and methods of implementing professional-team-builder systems.

BACKGROUND

Around the world, numerous professionals work in large, complex organizations (e.g., multinational corporations) that have many locations such as brick-and-mortar storefronts (e.g., bank branches), corporate centers, corporate campuses, office buildings, and the like. Additionally, more and more professionals are working remotely out of home offices, shared office spaces, coworking environments, and/or the like. These large organizations (e.g., financial-services institutions) also often have a large number of clients, including individuals, organizations (e.g., businesses, universities, charitable foundations, hedge funds, and the like), and/or other types of clients, which may also be referred to as client accounts. These types of organizations also often operate and manage large, complex information technology (IT) ecosystems for both internal operations and customer-facing activities, among other purposes.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
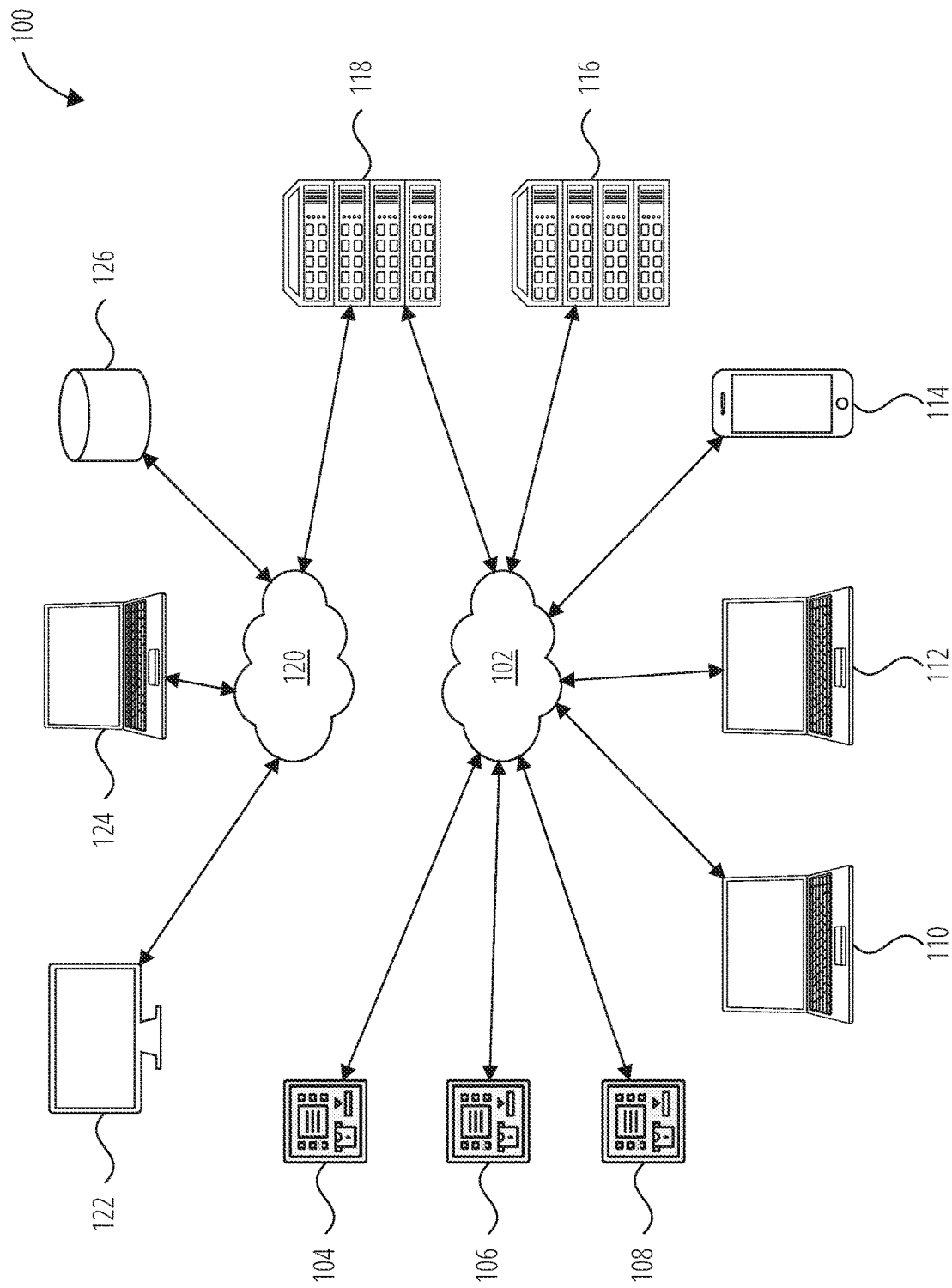
FIG. 1 illustrates an example network arrangement of an example financial-services institution, in accordance with at least one embodiment.

Among other inspirations and motivations, embodiments of the present disclosure arise in part from the realization and recognition that, with large, geographically dispersed workforces and numerous geographically dispersed clients, the easier it is for professionals to team up in service of their clients, the better. To that end, disclosed herein are systems and methods for implementing professional-team-builder systems.

Embodiments of the present disclosure enable professionals such as financial advisors that desire to form a client-service team with one or more other professionals to easily identify one another. In accordance with at least one embodiment, a professional can create and update their own team-builder-system profile and can also conduct searches for professionals (e.g., for their profiles) that are similar to themselves in one or more ways, complementary to themselves in one or more ways, and/or the like. It is noted that the examples that are primarily described herein relate to professionals at financial-services institutions (e.g., financial advisors), though it should be understood that this is by way of example and not limitation, as any types of professionals and/or any type of workers or other personnel would benefit from the systems and methods of the present disclosure, which provide insight into team-building opportunities.

In an example scenario, a professional-team-builder system is usable at a financial-services institution by professionals such as financial advisors, financial-advisors-in-training, bankers (who may be aspiring financial advisors), branch managers (e.g., producing branch managers), and/or the like. These professionals may use embodiments of the present disclosure to create (and update) their profiles and search for other professionals with whom they may desire to form (or join) a team to better service a set of one or more clients. Embodiments of the present disclosure capture and store useful and important business-profile information for each eligible professional, and allow professionals to opt in and search for other professionals that also wish to be on a team. In some embodiments, search results are limited to professionals that operate within a common geographical region and/or organizational division as the particular professional that is doing the searching. In at least one embodiment, professionals only have visibility to other professionals that are in their same division of the organization, and can only form teams among professionals that operate within a given geographical region.

In at least one embodiment, a team is defined as a set of two or more professionals that share a book of business that corresponds to one or more clients. In some cases, the formation of a team is memorialized via a signed a team agreement, which may define the terms of a given team as well as manage and/or mitigate risk if a team were to later be dissolved, analogous in some ways to a prenuptial agreement. In some embodiments, teams can only be formed when the corresponding shared client base that would be associated with the team corresponds to a minimum amount of business. Some embodiments allow for the adding of business to teams over time. In some implementations, a given professional is only permitted to be on one team at a time. In other implementations, professionals are permitted to be on multiple teams at the same time—in some such embodiments, there is a cap to the number of teams that a professional can be on; in other embodiments, there is no such limit.

Some embodiments of the present disclosure include a frontend user interface and a backend database system. Users (e.g., professionals) interact with the frontend user interface, which in turn communicates and interfaces with the backed database system. The backend database system may store one or more operational data store (ODS) tables containing profile data and other data relevant to the professional-team-builder system performing its functions. This interaction can facilitate the submission and processing of searches (e.g., database queries) to assist team formation. As stated, some embodiments limit visibility—i.e., search results—to a searching professional's own geographic region. Some embodiments also or instead limit visibility to a searching professional's own division within their organization. A division may also be referred to as a subfirm, a channel, and/or by one or more other names. In at least one embodiment, after a search is completed, a user is presented with a list of professionals that match a given set of search criteria, along with their profiles and contact information.

The above-mentioned user interface may be presented via a web application, a desktop application, a mobile app, and/or the like. In some cases, the professional-team-builder system is accessible via a dashboard interface used by the professional for any number of tasks. A given professional may create a profile by answering a series of questions (in, e.g., a wizard-type interface), by selecting items from one or more single-selection dropdowns and/or one or more multi-selection dropdowns, checking various boxes, completing text fields, and/or the like. The professional may then opt in for the team-builder feature of the professional-team-builder system. In some embodiments, profile fields and search criteria relate to aspects of team building such as goals for forming or enhancing a team, roles within their practice area that the professionals enjoy the most, the greatest strengths that the respective professionals feel they would bring to a team, and/or the like. Further embodiments and variations and permutations thereof are described below.

One embodiment takes the form of a method that includes: determining, by a professional-team-builder system that includes at least one hardware processor, whether a user of the professional-team-builder system is opted in or opted out for participation in a team-building function of the professional-team-builder system, where the user is a team-building-eligible professional from among a plurality of team-building-eligible professionals; if the user is opted in, then: displaying, via a user interface of the professional-team-builder system, an opted-in interface, the opted-in interface including a search interface, the search interface including a plurality of search-criteria fields; receiving, via the search interface, a set of search-criteria input; retrieving, from data storage, at least one profile matching the set of search-criteria input, each retrieved profile corresponding to a potential teammate of the user for a professional-services team, each potential teammate being an opted-in and team-building-eligible professional from among the plurality of team-building-eligible professionals; and displaying, via the user interface, one or more of the at least one retrieved profile; and if the user is opted out, then displaying, via the user interface, an opted-out interface, the opted-out interface including a create-profile element, an update-profile element, and/or an opt-in element.

Another embodiment takes the form of a professional-team-builder system that includes: a user interface; at least one hardware processor; and data storage that includes one or more non-transitory computer readable storage media containing instructions executable by the at least one hardware processor for causing the at least one hardware processor to perform at least the operations that are listed in the preceding paragraph. Still another embodiment takes the form of one or more non-transitory computer readable storage media containing instructions executable by at least one hardware processor for causing the at least one hardware processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment and/or a non-transitory-computer-readable-storage-media embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

FIG. 1 illustrates an example network arrangement 100 of an example financial-services institution. The network arrangement 100 is provided by way of example and not limitation, as a network arrangement of a given financial-services institution could have different numbers, types, and/or arrangements of devices, systems, networks, and/or the like. Moreover, the present disclosure is not limited in applicability to financial-services institutions, as embodiments of the present disclosure could be applied to many different types of organizations.

In the example network arrangement 100 that is depicted in FIG. 1, a number of different devices, systems, and the like are communicatively connected with a network 102 via respective communication links. These include an ATM 104, an ATM 106, an ATM 108, a laptop computer 110, a laptop computer 112, a mobile device 114, a server system 116, and a server system 118. In the depicted example, the server system 118 is also communicatively connected with a network 120. Also connected with the network 120 are a desktop computer 122, a laptop computer 124, and a database system 126. In at least one embodiment, only a subset of the devices, systems, and networks that are depicted in FIG. 1 are actually part of and managed by the aforementioned example financial-services institution. An example such subset includes the ATM 104, the ATM 106, the ATM 108, the server system 118, the network 120, the desktop computer 122, the laptop computer 124, and the database system 126.

In an example scenario, the network 102 could be a data-communication network such as, including, and/or in communication with the Internet. The network 102 could operate according to a suite of communication protocols such the Transmission Control Protocol (TCP) over the Internet Protocol (IP) (collectively, TCP/IP), the User Datagram Protocol (UDP) over IP (UDP/IP), and/or others. The network 120 could be a private IP network operated by the aforementioned financial-services institution. In addition to other functions, the server system 118 could provide network-access-server (NAS) functions, gateway services, firewall protections, and/or the like for the network 102 with respect to the network 120. Any of the devices in communication with the network 102, such as one or more of the ATM 104, the ATM 106, the ATM 108, the laptop computer 110, the laptop computer 112, the mobile device 114, and/or the server system 116, could communicate via the network 102 and the server system 118 with one or more entities on the network 120, in some cases doing so via a virtual private network (VPN) and/or another type of secure-tunneling communication protocol, connection, and/or the like.

Any one or more of the ATM 104, the ATM 106, and the ATM 108 could be an ATM that provides conventional ATM-type services such as cash withdrawal, check deposit, account transfers, balance inquiries, bill pay, and/or the like. Users may access any one or more of the ATM 104, the ATM 106, and the ATM 108 using a secure card, a mobile device such as the mobile device 114, and/or the like, along with security credentials such as a personal identification number (PIN), password, passcode, and/or the like. In some implementations, biometric authentication is used by the ATM 104, the ATM 106, and/or the ATM 108.

In an embodiment, the server system 118 hosts a webserver application that provides an online-banking webportal application that can be accessed by devices such as the laptop computer 110, the laptop computer 112, the mobile device 114, and/or the like. As another example, a mobile-banking app could be downloaded by, installed on, and executed by mobile devices such as the mobile device 114, to provide a user of the mobile device 114 access to one or more accounts managed by the aforementioned financial-services institution. The server system 118 may host a professional-team-builder system in accordance with embodiments of the present disclosure, and may provide access to that system via a web interface, a desktop application, a mobile app, and/or the like.

Moreover, although pictured as merely a data-storage container, the database system 126 could include—in addition to one or more data-storage containers, devices, units, and/or the like—one or more database servers that operate to serve requests to carry out database operations with respect to the database system 126, where such database operations could include retrieving data, extracting data, modifying data, updating data, removing data, and/or the like. Moreover, although the database system 126 is shown as being in a single network location in the network arrangement 100, the database system 126 could include multiple different data silos in multiple different geographic and/or network-topology locations. In at least one embodiment, the database system 126 provides a database-system backend for a professional-team-builder system, as described by way of example herein.

Any of the devices, systems, and the like that are depicted in FIG. 1 and/or in any of the other figures could have an architecture similar to that described below in connection with the example computer system 1000 of FIG. 10 and could contain and execute software having an architecture similar to that described below in connection with the example software architecture 1102 of FIG. 11. Moreover, any of the communication links depicted in FIG. 1 and/or in any of the other figures could be or include one or more wired-communication links (e.g., Ethernet, fiber optic, Universal Serial Bus (USB), and/or the like) and/or one or more wireless-communication links (e.g., Wi-Fi, LTE, NFC, Bluetooth, Bluetooth Low Energy, and/or the like). Any one or more of the communication links could include one or more intermediate devices such as one or more routers, bridges, servers, access points, base stations, and/or the like. Additionally, any communication link could include one or more VPNs and/or other tunneling-type connections.

Figure 2:
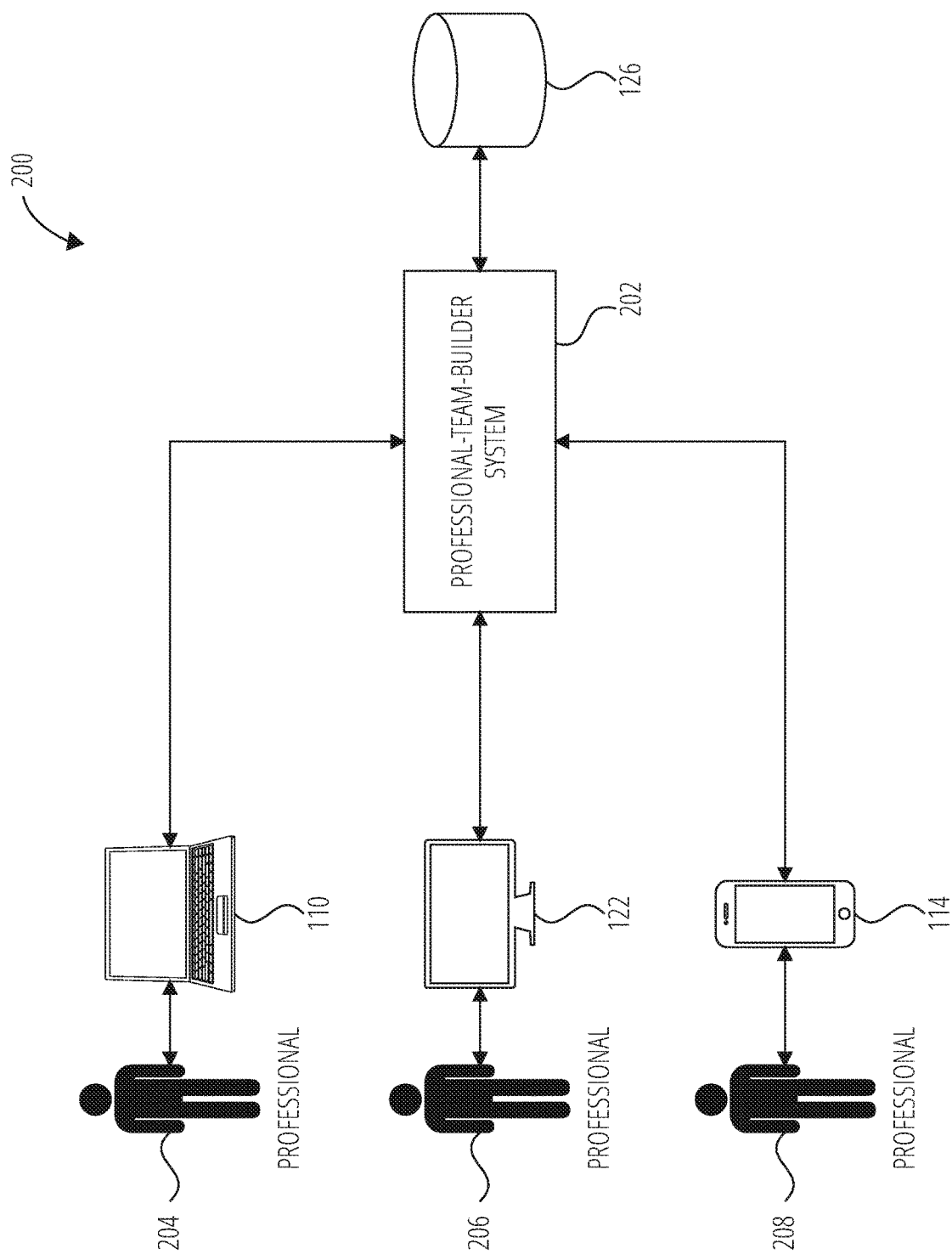
FIG. 2 illustrates an example communication scenario involving an example professional-team-builder system and several example professionals, in accordance with at least one embodiment.

FIG. 2 depicts an example communication scenario 200, in accordance with at least one embodiment. Some of the entities in FIG. 2 are described above in connection with FIG. 1—i.e., the laptop computer 110, the mobile device 114, the desktop computer 122, and the database system 126. Also depicted in the communication scenario 200 are a professional-team-builder system 202, a professional 204, a professional 206, and a professional 208. The communication scenario 200 is presented here by way of example and not limitation, as other communication scenarios could be implemented in connection with various different embodiments. While three professionals are shown by way of example, it should be understood that this low number is for clarity of presentation, and that any number of professionals could make use of a professional-team-builder system in accordance with embodiments of the present disclosure. Moreover, the communication scenario 200 is intended to illustrate, in a simplified graphical way, the entities that may communicate with one another in accordance with embodiments of the present disclosure.

As shown in the communication scenario 200, the professional 204 is associated with the laptop computer 110, the professional 206 is associated with the desktop computer 122, and the professional 208 is associated with the mobile device 114. These devices could be owned by the respective professionals, issued to the respective professionals by the organization for which they work, and/or the like. Moreover, a given professional may be associated with multiple devices and may be able to access the professional-team-builder system 202 from any one of them. As described above, the professional-team-builder system 202 may be hosted by the server system 118, as an example. In other embodiments, the professional-team-builder system 202 may be hosted by the server system 116, or by a server or server system that is connected to the network 120 but not directly connected to the network 102. Certainly numerous such arrangements are possible.

Figure 3:
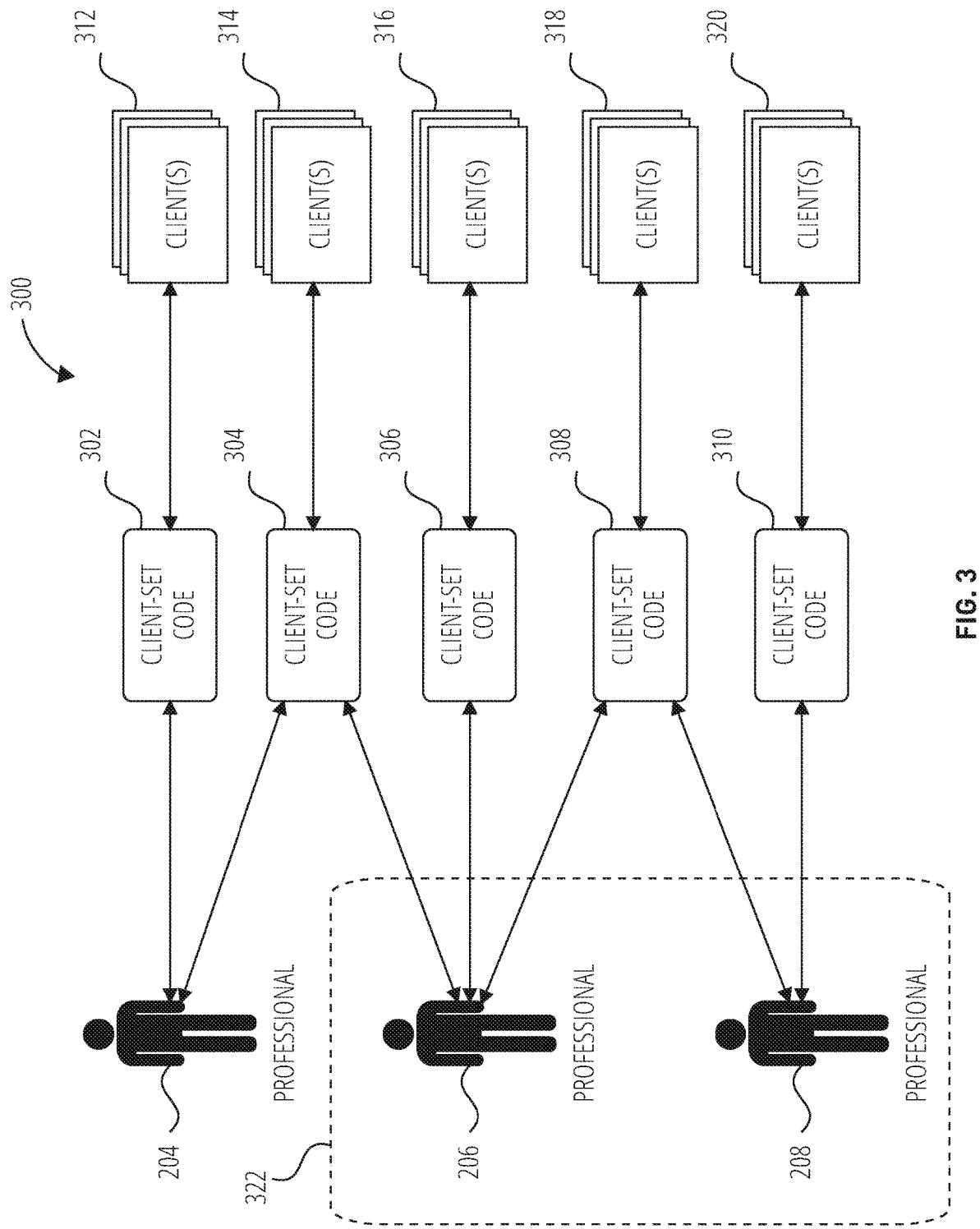
FIG. 3 illustrates an example organizational chart involving the example professionals of FIG. 2, in accordance with at least one embodiment.

FIG. 3 depicts an example organizational chart 300, in accordance with at least one embodiment. Many variations on the example organizational chart 300 could be presented here, as the arrangement that is shown in FIG. 3 is provided by way of example and not limitation. In the organizational chart 300, it can be seen that the professional 204 is associated with a client-set code 302, which in turn is associated with a client set 312. The professional 204 is also associated with a client-set code 304, which in turn is associated with a client set 314. Furthermore, the professional 206 is associated with the client-set code 304 (and therefore with the client set 314), a client-set code 306 (and therefore with a client set 316), and a client-set code 308 (and therefore with a client set 318). Lastly, the professional 208 is associated with the client-set code 308 (and therefore with the client set 318) and with a client-set code 310 (and therefore with a client set 320).

It can be appreciated from FIG. 3 that each client-set code is uniquely associated with a respective client set, each of which includes one or more clients. It can also be appreciated that each professional can be associated with one or more client-set codes. In at least one embodiment, each professional is associated with a respective client-set code that corresponds to the one or more clients that are not shared by that professional with one or more other professionals. For example, the professional 204 is the only professional that is associated with the client-set code 302 and therefore with the client set 312. Similarly, the professional 206 is the only professional associated with the client-set code 306 and therefore with the client set 316, and the professional 208 is the only professional associated with the client-set code 310 and therefore with the client set 320. If a particular professional does not also share one or more other clients with one or more other professionals, that one client-set code will be the only client-set code associated with that professional according to at least one embodiment.

It can also be seen in FIG. 3 that, as described, the professional 204 and the professional 208 are each respectively associated with two client-set codes and therefore with two client sets, while the professional 206 is associated with three client-set codes and therefore with three client sets. In various different embodiments, a given professional can be associated with any number of client-set codes and therefore with any number of client sets. Some organizations may place limits on the number of client-set codes permitted per professional, while other organizations may not.

Also depicted by way of a dashed outline in FIG. 3 is an example team 322, which in the depicted example contains two professionals: the professional 206 and the professional 208. As stated above, in some embodiments, a given professional is only permitted to be on one "official" team at a time; in other embodiments, professionals are permitted to be on multiple official teams. FIG. 3 also illustrates the fact that, in at least one embodiment, a given professional (e.g., the professional 206) can (i) be on a team (e.g., the team 322) with one or more professionals (e.g., the professional 208) in association with one client-set code (e.g., the client-set code 308) for one shared client set (e.g., the client set 318) and (ii) share another client set (e.g., the client set 314) in connection with another client-set code (e.g., the client-set code 304) with one or more other professionals (e.g., the professional 204). And this architecture is extensible and scalable to any number and size of such associations deemed suitable by those of skill in the relevant arts for a given implementation.

Figure 4:
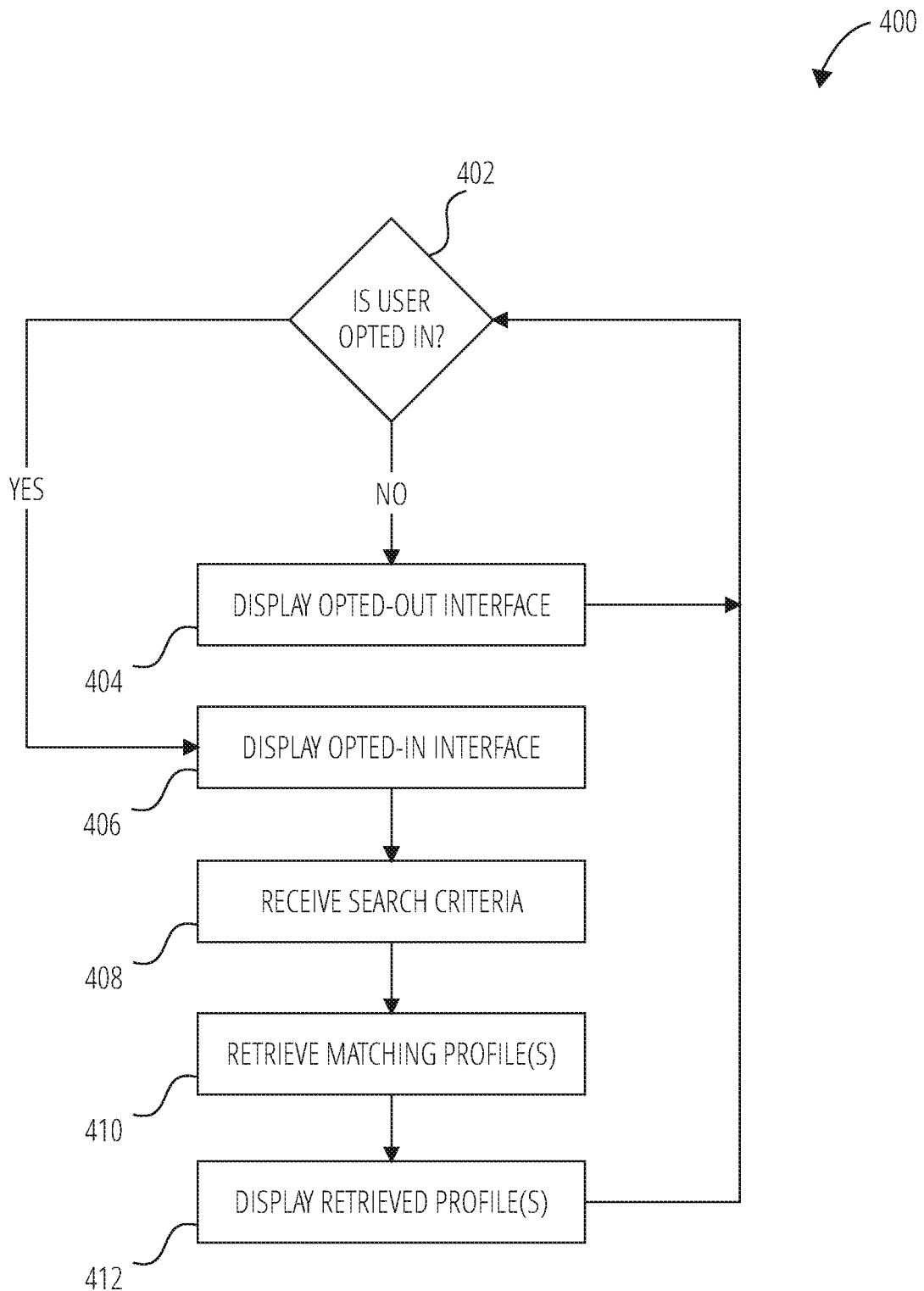
FIG. 4 illustrates an example method that may be performed by the example professional-team-builder system of FIG. 2, in accordance with at least one embodiment.

FIG. 4 illustrates an example method 400 in accordance with at least one embodiment of the present disclosure. As a general matter, the method 400 could be performed by any one or any combination of devices, systems, and/or the like that are programmed and/or otherwise arranged to perform the operations described herein. By way of example and not limitation, the method 400 is described herein as being performed by the professional-team-builder system 202. Moreover, also by way of example, the method 400 is described below from the perspective of the professional 204 using the laptop computer 110 to interact with a web-based user interface of (e.g., provided by) the professional-team-builder system 202. Furthermore, the description below begins at a state in which the professional 204 is logged into the professional-team-builder system 202.

At operation 402, the professional-team-builder system 202 determines whether the professional 204 is opted in or opted out for participation in the team-building function of the professional-team-builder system 202. Being "opted in" and "opted out" are further described below. If, at operation 402, the professional-team-builder system 202 determines that the professional 204 is currently opted out, then control proceeds to the below-described operation 404. If, however, the professional-team-builder system 202 instead determines at operation 402 that the professional 204 is currently opted in (e.g., has previously opted in and has since that time not opted out of the team-building function), then control proceeds to the below-described operation 406. In at least one embodiment, as a default setting of the professional-team-builder system 202, users are initially opted out until they affirmatively opt in; the reverse convention could be implemented instead.

Before proceeding to the description of the other operations in the method 400, it is noted that, in at least one embodiment, the professional-team-builder system 202 identifies a set of team-building-eligible professionals from a larger set of professionals based on one or more team-building-eligibility criteria. Moreover, in some such embodiments, from time to time (e.g., periodically and/or in response to administrator-issued commands, etc.), the professional-team-builder system 202 audits and updates the set of team-building-eligible professionals based on the team-building-eligibility criteria. Such a periodic and/or administrator-triggered review may identify professionals that are currently categorized as eligible but in fact are not currently eligible and/or professionals that are currently categorized as ineligible but are in fact currently eligible. In various different embodiments, the team-building-eligibility criteria can include criteria such as a professional having created a profile for themselves on the professional-team-builder system 202, a professional having an eligible job title, a professional being (e.g., working) in an eligible division of the organization, a professional having an eligible employment status (e.g., actively employed), and/or the like. In some embodiments, if a professional (or, more generally stated, a user) transfers from one division of a given organization to another, the professional-team-builder system 202 automatically opts them out and they can later affirmatively opt in as part of their new division.

With respect to having an eligible job title, in at least one embodiment, this takes the form of having what is referred to herein as a "rolled-up job title," which is a job title that in effect encapsulates some number of actual job titles that are used in the organization. For example, if an organization maintained a large number (e.g., 40) different titles that could all be considered a type of financial advisor, the professional-team-builder system 202 could treat all of those as having a job title of financial advisor for the purposes of profile creation, profile searching, and/or the like.

Figure 5:
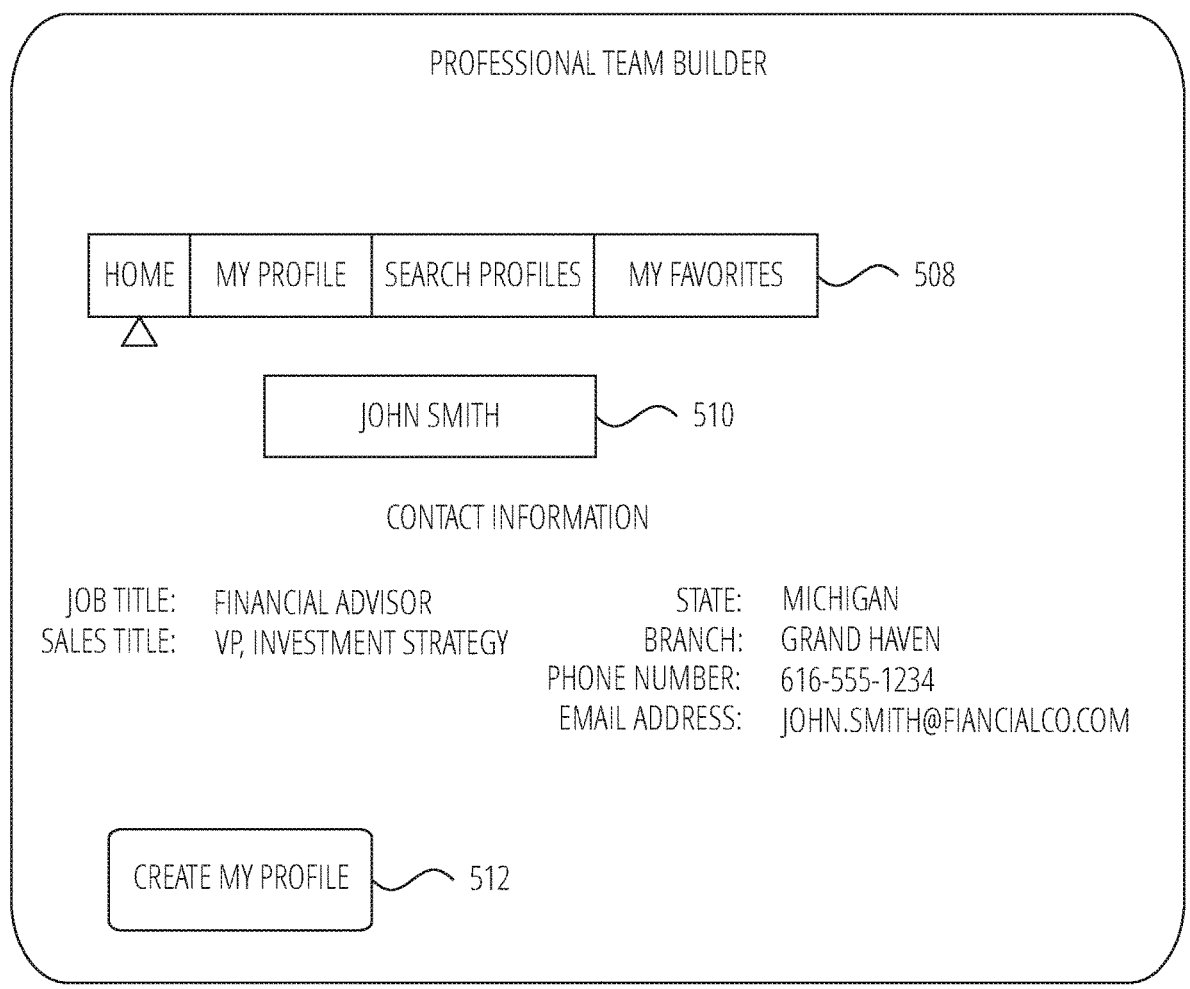
FIG. 5 illustrates a first example tab of an example opted-out interface of the example professional-team-builder system of FIG. 2, in accordance with at least one embodiment.

Returning to the flowchart of FIG. 4, if the professional-team-builder system 202 determines (at operation 402) that the professional 204 is opted out (i.e., not opted in in the parlance of FIG. 4), then, at operation 404, the professional-team-builder system 202 displays an opted-out interface, an example one of which is the opted-out interface 500 of FIG. 5. As can be seen in FIG. 5, the opted-out interface 500 includes four tabs: a home tab 502, a my-profile tab 504, a search-profiles tab 506, and a my-favorites tab 508. In an example embodiment, while the professional 204 is opted out, only the home tab 502 and the my-profile tab 504 are enabled, while the search-profiles tab 506 and the my-favorites tab 508 are disabled. In at least one embodiment, the user interface described herein is implemented as what is known in the relevant arts as a single page application (SPA), which updates portions of a single page rather than implementing reloads of entire pages.

As can be seen in FIG. 5, the opted-out interface 500 is displaying the home tab 502, as indicated in FIG. 5 by the triangle icon under the word "HOME." The home tab 502 includes a name field 510 that contains the name of the logged-in professional (i.e., the professional 204 in this example). Furthermore, the home tab 502 includes example contact information for the professional 204. (The example name and example contact information are purely fictional and not intended to correspond to any actual person.) The home tab 502 also includes a create-profile button 512, which is selectable by the professional 204 to transition the user interface to a screen on which the professional 204 can create a profile to represent them in the professional-team-builder system 202. (In this example, the professional 204 had not previously created a profile. If, however, the professional 204 had previously created a profile, the create-profile button 512 could instead be an update-profile button, a review-and-update profile button, a view-profile button, an edit-profile button, and/or the like.)

Figure 6:
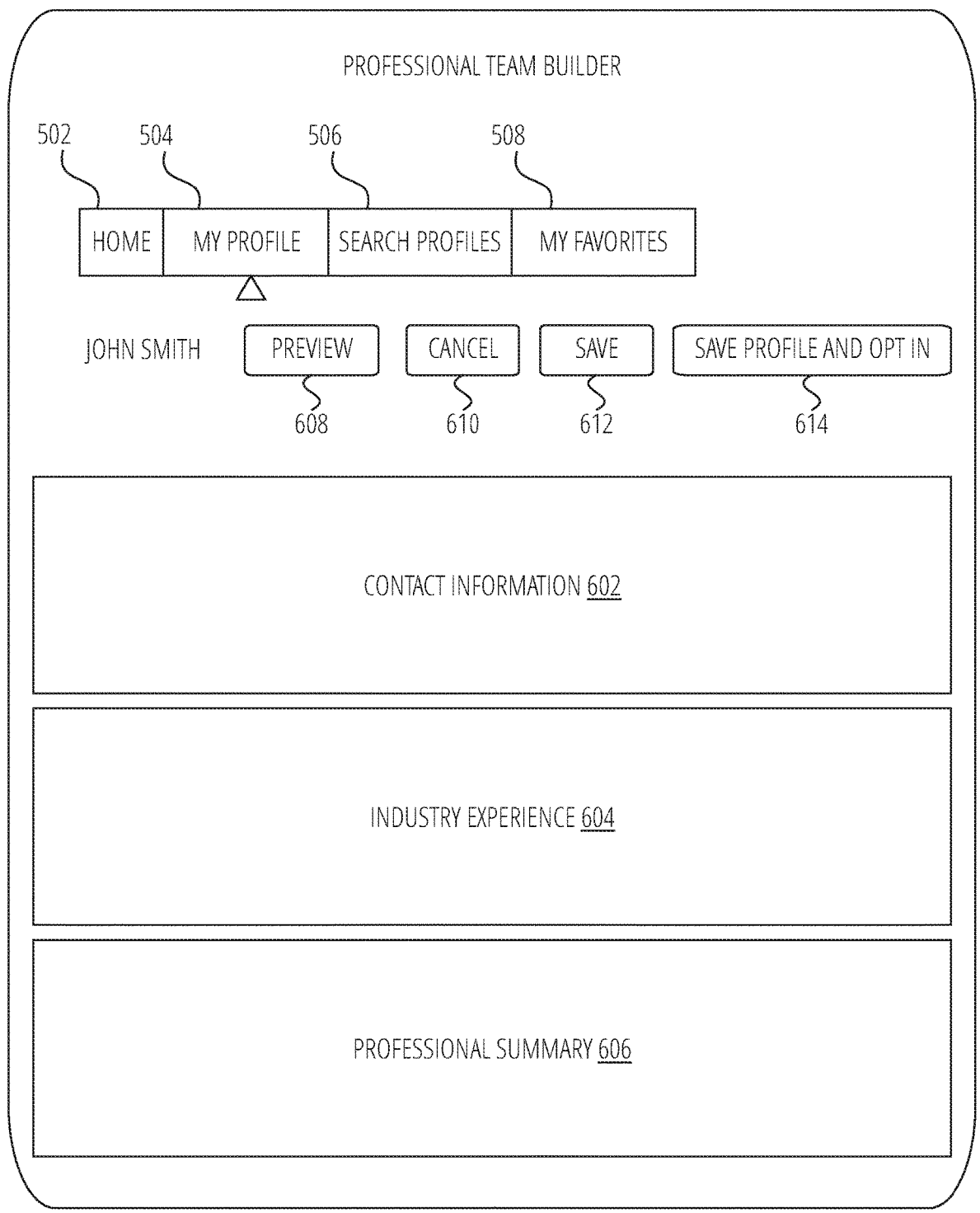
FIG. 6 illustrates a second example tab of the example opted-out interface of FIG. 5, in accordance with at least one embodiment.

In at least one embodiment, if the professional 204 selects (e.g., clicks on) the create-profile button 512 of FIG. 5, the professional-team-builder system 202 responsively displays a create-profile interface, an example one of which is depicted in FIG. 6 as the my-profile tab 504 of the opted-out interface 500. In FIG. 6, it can be seen that the my-profile tab 504 includes the name of the professional 204, a preview-profile button 608, a cancel button 610, a save-profile button 612, and a save-profile-and-opt-in button 614. The my-profile tab 504 that is shown in FIG. 6 also includes a contact-information section 602, an industry-experience section 604, and a professional-summary section 606. In at least one embodiment, any opt-in element (e.g., button) is disabled for users that have not created a profile for joining the team-building function of the professional-team-builder system.

The preview-profile button 608 may be operable to show a preview of the profile given the information that the professional 204 has entered up to that point. The cancel button 610 may be operable to return to the home tab 502 being displayed as shown in FIG. 5. The save-profile button 612 may be operable to save to the database system 126 the input that the professional 204 had entered up to that point; the save-profile-and-opt-in button 614 may be operable to do that and also opt in the professional 204 to the team-building function of the professional-team-builder system 202.

The contact-information section 602 may display the contact information of the professional 204 and may also include checkboxes (or other togglable elements (e.g., two-position sliders)) with which the professional 204 can select, for each item of their contact information, whether that item will be shown on their profile in the search results of other professionals or instead hidden in such results. It is noted that, in the ensuing description, the use of "checkboxes" is meant as a generalized term for any togglable elements and/or any other user-interface elements by which a "show" or "hide" input could be communicated to the professional-team-builder system 202.

The industry-experience section 604 may include fields that display industry-experience information about the professional 204. This information could be stored in and pulled from the database system 126 as part of displaying the create-profile interface. Like the contact information, each item of industry-experience information could have an associated checkbox via which the professional 204 can indicate whether they want that item shown in or hidden from their profile as viewed by potential teammates of the professional 204. Some example fields of industry-experience information in the financial-services context include assets under management (AUM), length of service at current organization, length of service in the industry generally, whether or not the professional is currently on a team, states in which the professional is licensed and/or registered, professional designations, current number of households in their client base, current number of those households having accounts in excess of a specified threshold value (e.g., dollar amount), and/or the like.

In at least one embodiment, hidden profile elements are not searchable by, and not displayed to, potential teammates of the user. For example, if a first user unchecks AUM, and if a second user searches on AUM, the first user will not be returned in the search results even if they meet the AUM search criteria. Furthermore, in at least one embodiment, if a given profile is otherwise a hit based on non-hidden fields, the hidden fields will appear blank in the search results.

The professional-summary section 606 may include a number of single-selection and/or multi-selection dropdowns that each have an associated show/hide checkbox similar to those described above. Some example categories that the dropdowns could cover include professional strengths, results of a DiSC Assessment, goals for forming or enhancing a team (e.g., some top reasons why the individual would like to form or join a team), roles and/or functions within their practice that they enjoy the most, and/or the like. Some example goals for forming or enhancing a team include growing their practice, increasing their capacity to provide better service, offering more specialized services to clients, and/or the like. Some example strengths, include being detail-oriented, being big-picture-oriented, managing people, mentoring people, networking, and/or the like.

Figure 7:
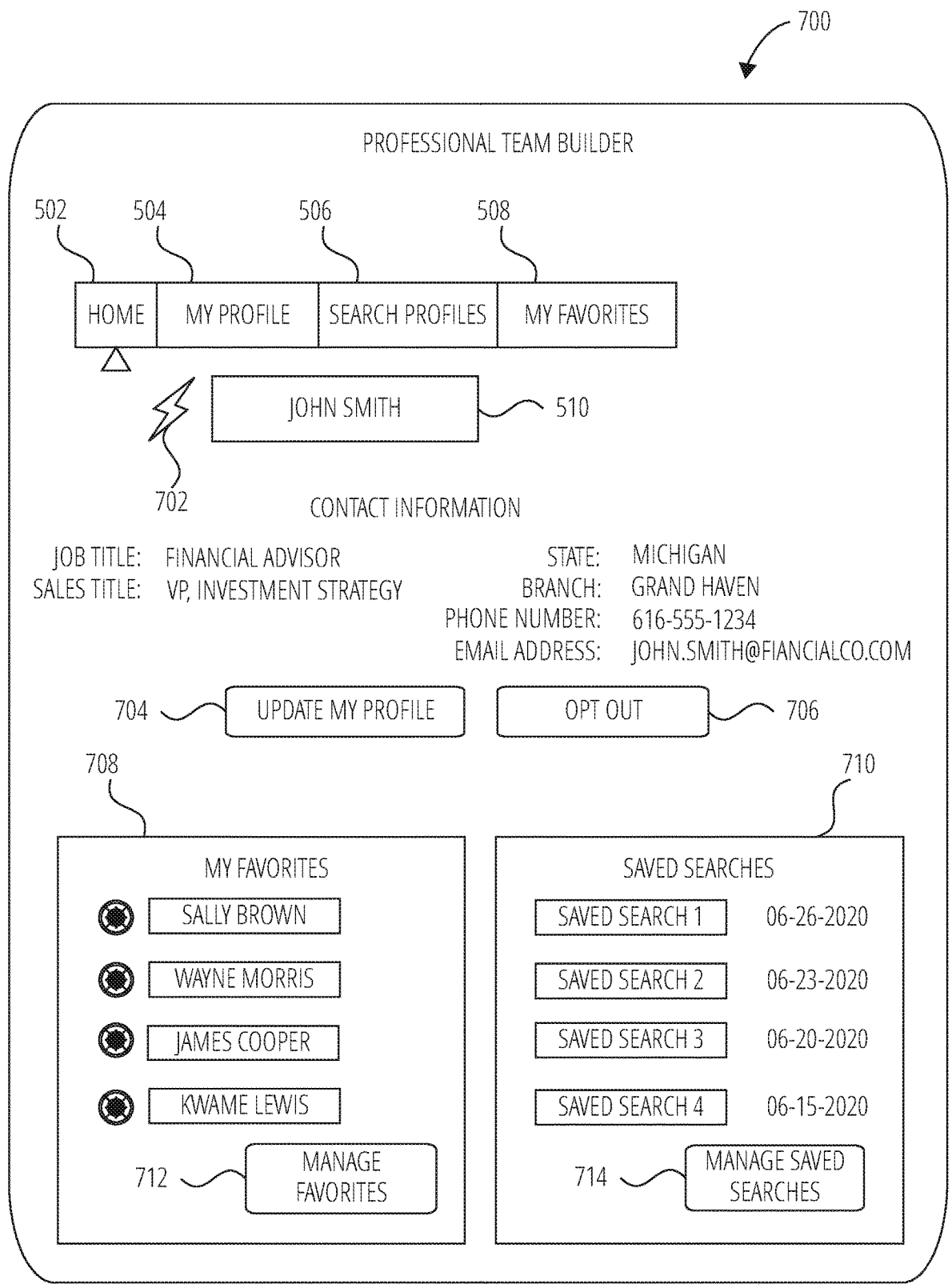
FIG. 7 illustrates an example home tab of an example opted-in interface of the example professional-team-builder system of FIG. 2, in accordance with at least one embodiment.

Returning again to the flowchart of FIG. 4, if the professional-team-builder system 202 determines (at operation 402) that the professional 204 is opted in, then, at operation 406, the professional-team-builder system 202 displays an opted-in interface. Continuing the above example, if the professional 204, when viewing the screen of FIG. 6, made selections in various dropdowns, made selections in various show/hide checkboxes for various items (or left the default values (e.g., "Display") there), and then clicked on the save-profile-and-opt-in button 614, the professional-team-builder system 202 may responsively save their profile to the database system 126, mark them as opted in (and determine at operation 402 that they are opted in), and then display the example opted-in interface 700 that is shown in FIG. 7. In particular, FIG. 7 displays the home tab 502 of the opted-in interface 700, including the name field 510, contact information for the professional 204, an update-profile button 704, an opt-out button 706, a my-favorites box 708, and a saved-searches box 710. It is noted that, in at least one embodiment, the search-profiles tab 506 and my-favorites tab 508 (if present) both become enabled once the professional 204 has opted in.

In at least one embodiment, the opted-in indicator 702 serves as a visual indicator that the professional 204 is currently opted in for the team-building function of the professional-team-builder system 202. Certainly other types of visual indicators could be used, and some embodiments do not employ a visual indicator such as the opted-in indicator 702 to indicate an active profile corresponding to an opted-in professional. The update-profile button 704 may be operable to return the professional-team-builder system 202 to displaying a screen similar to the screen shown in FIG. 6 on which the professional 204 could update and then re-save their profile. The opt-out button 706 may be operable to opt the professional 204 back out of the team-building function of the professional-team-builder system 202, and may return the display to one similar to that shown in FIG. 5.

The my-favorites box 708 shows four example favorite profiles stored by the professional 204. In various different embodiments, any number of favorites could be shown. Each may be a link that is operable to display a screen with some or all of the substance of the corresponding profile.

The my-favorites box 708 may get populated by the professional 204 selecting a previously unselected favorite icon next to a given profile name in a search result. The my-favorites box 708 also includes a manage-favorites button 712, which may be operable to take the user to a screen (e.g., the my-favorites tab 508) on which the user could add favorites, edit favorites, organize (e.g., categorize) favorites, delete favorites, and/or the like. The user may be able to click on the "favorite" icon to the left of a given favorite to deselect that profile. In this disclosure, a circular icon marked with a filled-in circle in the center symbolizes a favorite, whereas a circular icon without a filled-in circle in the center symbolizes a non-favorite.

When the professional 204 conducts a search with a given set of search criteria, the user may wish to save that search. The saved-searches box 710 shows four saved searches sorted in descending chronological order. The saved-searches box 710 includes a manage-saved-searches button 714, which may be operable to take the user to a screen where the user could perform management functions with respect to their saved searches, where those management functions may be similar to those described in the preceding paragraph in connection with the manage-favorites button 712.

Figure 8:
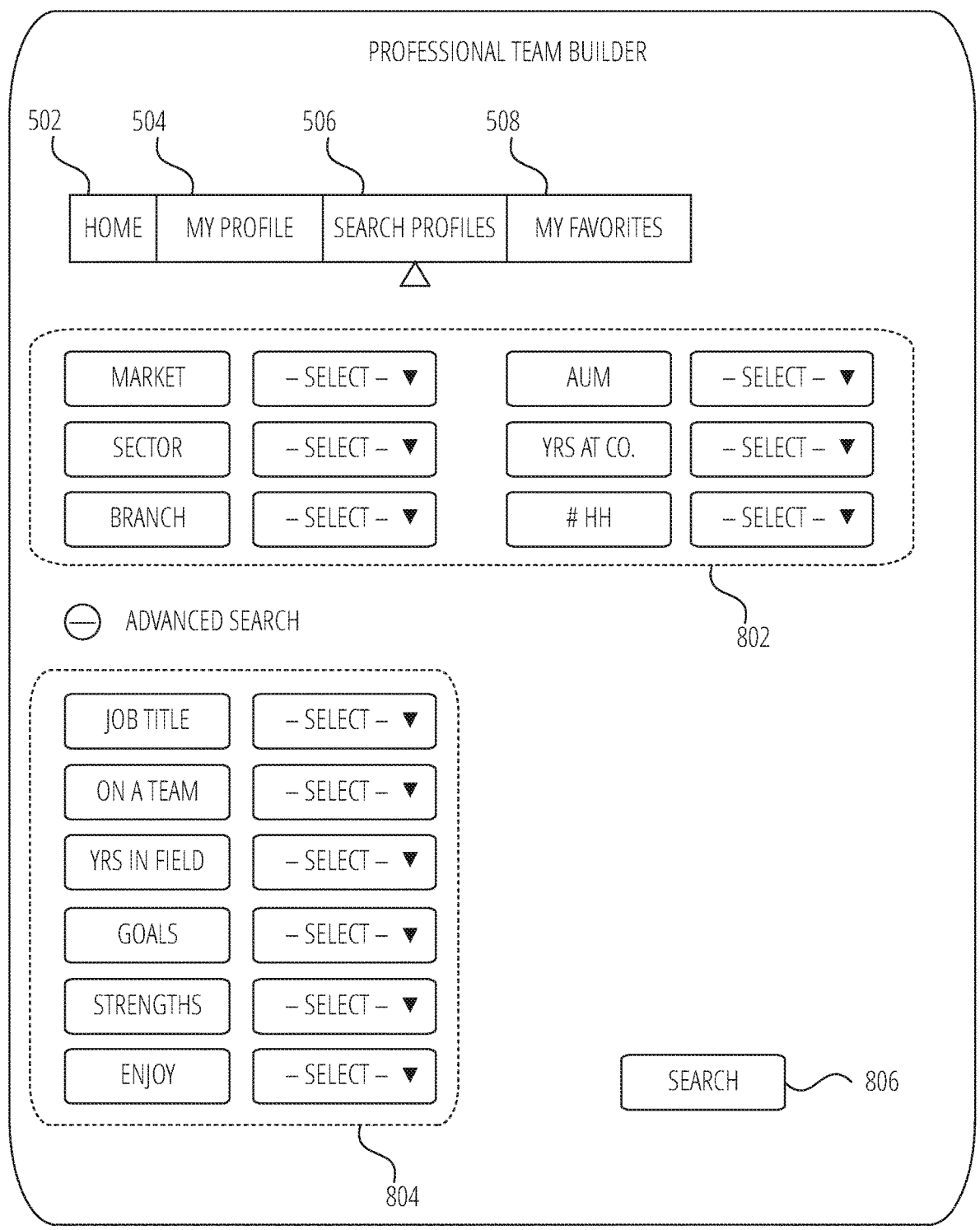
FIG. 8 illustrates a first example view of an example search interface, in accordance with at least one embodiment.

The opted-in interface 700—that in the described example is displayed at operation 406—further includes a search interface, which is accessible by clicking on the search-profiles tab 506. This may result in display of a screen such as the screen that is shown in FIG. 8, which depicts the search-profiles tab 506 of the opted-in interface 700. As can be seen in FIG. 8, the search-profiles tab 506 includes a group of primary search fields 802, a group of advanced-search fields 804, and a search button 806. In at least one embodiment, the advanced-search fields 804 can be accessed by clicking on a "+" icon, which then displays as a "−" icon as is shown in FIG. 8. Some embodiments have only one group of search fields instead of having a primary group and an advanced group; other embodiments have more than two groups of search fields. The search button 806 may be operable to conduct a search, as described below.

In the depicted embodiment, the primary search fields 802 include fields for market, sector, branch, AUM, years at the company, and number of households served. These are presented here by way of example and not limitation, as any number and any type of search fields could be present. As used in this example, market represents a geographical subset of a region to which the user's visibility is already limited, and sector represents a geographical subset of a market. Branch refers in this example to a physical storefront branch location at which a given professional works. Furthermore, the advanced-search fields 804 as depicted in FIG. 8 include job title, a Boolean field for whether or not the professional is currently on a team, years in the field (e.g., industry), goals, strengths, and roles (e.g., aspects) of the job that particular professionals enjoy the most. The advanced-search fields 804 are also presented here by way of example and not limitation. In some embodiments, the professional-team-builder system 202 includes a "match me" feature within one or more fields (e.g., dropdowns), where the professional-team-builder system 202 responsively selects the same choices for that category as were selected by the searching professional. Some embodiments also or instead include a "complement me" feature within one or more fields, where the professional-team-builder system 202 responsively selects the choices for that category that were not selected by the searching professional.

Any search field could be a single-selection dropdown (e.g., "Yes" or "No" for "On a Team"), a multi-selection dropdown (e.g., select all that apply for "Goals"), a free-text field for text-based (e.g., natural-language) searching, and/or the like. In at least one embodiment, the primary search fields 802 and the advanced-search fields 804 together correspond to the fields that can be in a given profile. In at least one embodiment, the set of search-criteria fields on a search interface that is presented by the professional-team-builder system 202—and, correspondingly, the set of profile fields that are available during profile creation—is specific to a division to which the user belongs (e.g., works) among multiple divisions in an organization in which the user is a professional. For example, while a branch field is displayed in FIG. 8, that field may not be part of profiles or part of searching for profiles for professionals that work in a different division of the organization than the division in which the professional 204 works.

Returning again to the flowchart of FIG. 4, at operation 408, the professional-team-builder system 202 receives, via the search-profiles tab 506, a set of search-criteria input. The professional 204 may have made various selections for one or more of the primary search fields 802 and/or one or more of the advanced-search fields 804, and then clicked on the search button 806 to conduct the search. At operation 410, the professional-team-builder system 202 retrieves, from the database system 126, at least one profile matching the set of search-criteria input that was received by the professional-team-builder system 202 at operation 408. In at least one embodiment, each retrieved profile corresponds to a potential teammate of the user for a professional-services team, where each such potential teammate is, like the professional 204, an opted-in and team-building-eligible professional from among the overall set of team-building-eligible professionals. As discussed above, in various different embodiments, each retrieved profile is associated with a same geographic region as the professional 204 and/or a same division of the organization as the professional 204.

Figure 9:
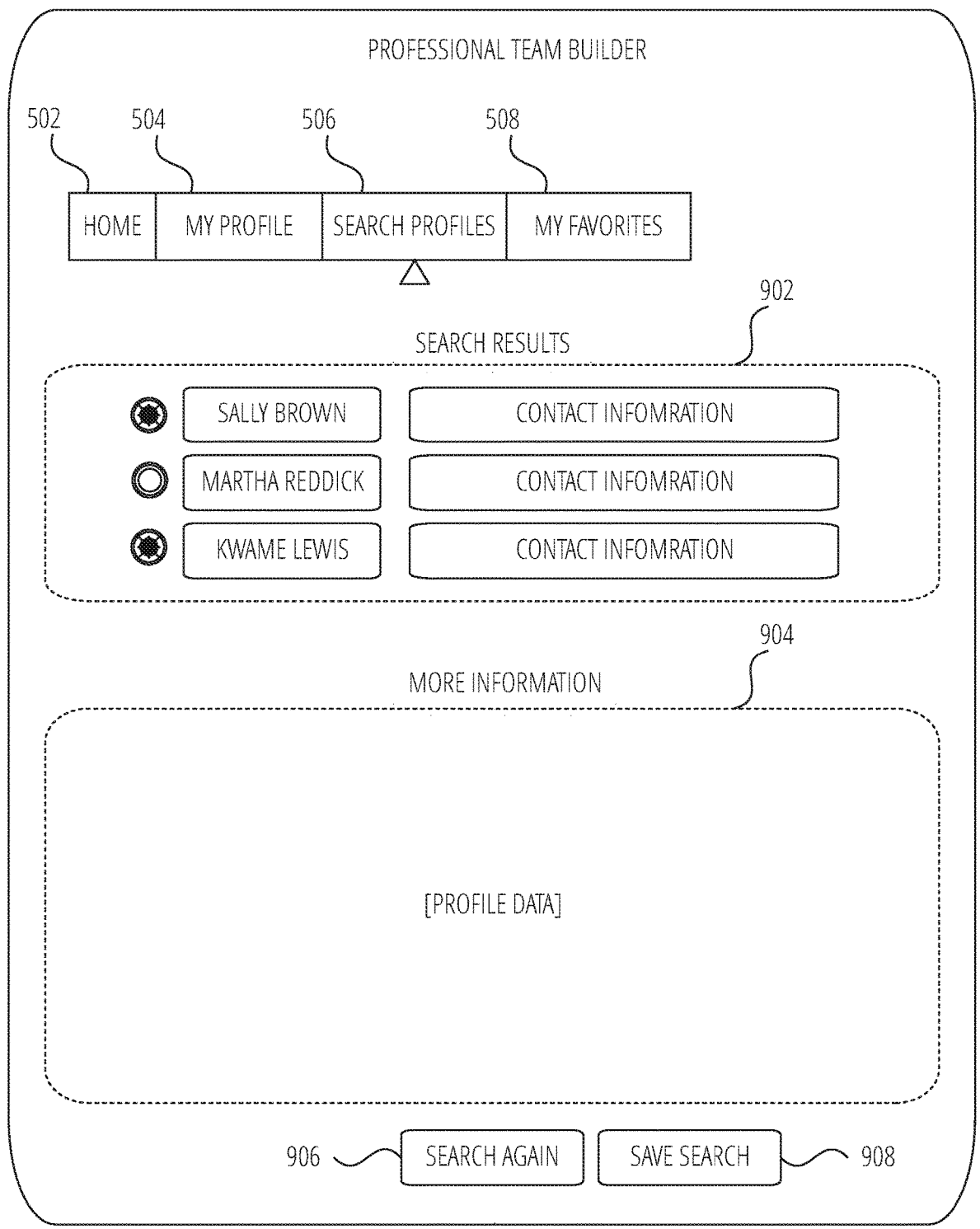
FIG. 9 illustrates a second example view of an example search interface, in accordance with at least one embodiment.

At operation 412, the professional-team-builder system 202 displays, via the user interface, one or profiles that were retrieved at operation 410. FIG. 9 shows an example view of the search-profiles tab 506 where search results have been retrieved and are being displayed via the user interface. In this example depiction, three search results are depicted in a search-results field 902 as having matched search criteria, though more than three profiles could have matched the search criteria and only three are displayed at any one time. As can be seen in FIG. 9, the first and the third results are already favorites of the professional 204, while the second result is not. In the depicted embodiment, contact information is displayed in connection with each displayed result. In this example, clicking on any one of the results displays full profile information in a profile-display field 904. A display such as the example display of FIG. 9 enables the professional 204 to add or remove favorites by toggling the corresponding icons, assess potential teammates for a good fit for teaming with the professional 204, and the like.

In one example scenario, the professional 204 may navigate to the opted-in interface 700 and select (e.g., click or tap on) the opt-out button 706. The professional-team-builder system 202 may responsively ask the user to confirm their intention to opt out. If the professional 204 cancels that request, the professional-team-builder system 202 may simply return to displaying the opted-in interface 700. If, however, the professional-team-builder system 202 asks for such confirmation and receives it or does not ask for such confirmation, the professional-team-builder system 202 may responsively opt the professional 204 out of the team-building function of the professional-team-builder system.

In various different embodiments, opting out a user out of the team-building function of the professional-team-builder system 202 may involve disabling a search interface (e.g., the search-profiles tab 506), removing the search interface (e.g., the search-profiles tab 506) from even being a visible option, removing the profile of the opted-out user from being among a set of profiles that is searchable by potential teammates, removing the user's profile from any one or more sets of favorites of other professionals, displaying an opted-out interface such as the opted-out interface 500, and/or the like. In at least one embodiment, after receiving the opt-out command and disabling the search interface, the professional-team-builder system 202 continues to still persist the profile of the user in the database system 126. The professional-team-builder system 202 may also persist the favorite selections of the user even while preventing the user from currently viewing them. The opting out may also include disabling a favorites interface such as the my-favorites tab 508.

If the professional-team-builder system 202 later receives an opt-in command associated with the user, the professional-team-builder system 202 may responsively display an opted-in interface (e.g., the opted-in interface 700). The professional-team-builder system 202 may also restore the profile of the user to being searchable by potential teammates, and may also restore the status of that profile as a favorite of one or more other users that had previously designated the profile as a favorite. In at least one embodiment, events such as a user opting in, a user opting out, a user updating their profile, and/or the like result in an alert being generated to the user. Such an alert could take the form of a mobile alert, and email, and/or the like. In some instances one or more other users (e.g., a manager) are also alerted of such events. In at least one embodiment, notification emails are sent to the user with the manager Cc:ed on the emails. In some embodiments, opted-in alerts and/or updated-profile alerts include current profile details.

In at least one embodiment, the professional-team-builder system 202 also includes an administrative interface that is viewable only to administrative users that have appropriate rights and privileges to view the administrative interface. The administrative interface may include screens that are similar to screens used by users to create and/or update their respective profiles, but with one difference being that the administrative interface includes checkboxes next to one or more of the fields such that the administrative users and control which fields do and do not appear on profiles, profile-creation screens, profile-update screens, search interfaces, and search results. In at least one embodiment, if an administrative user unchecks a field, that field would disappear from users' profiles, search screens, etc.; if the administrative user later rechecks the field, the field would show up again and answers that had previously been provided by users for that field would again be displayed. The administrative interface may permit such control over field visibility on a per-division basis of the organization. The administrative interface may further facilitate the editing of help text, the production of admin-level reports, the viewing of profiles filtered by division, region, market, sector, branch, and/or one or more other filters.

The administrative interface may further include per-field checkboxes that control whether or not users have the option to hide certain fields or not. That is, in at least one embodiment, system administrators can control which fields can and cannot be hidden by users on their profiles. In at least one embodiment, the professional-team-builder system 202 alerts users if a given field that the user had selected to be hidden is set via the administrative interface as unable to be hidden.

Another function that the administrative interface could provide is the ability for administrative users to edit available selections in, e.g., dropdowns. The administrative interface may further enable administrative users to perform one or more functions such as updating profile questions, enabling and disabling individual profiles (for, e.g., employment reasons), and/or the like. In at least one embodiment, if an administrative user disables a profile of a given user, the professional-team-builder system 202 responsively opts that user out of the team-building function of the professional-team-builder system 202, which makes that profile not searchable (i.e., not findable) by other users.

The administrative interface may have a different set of tabs than the interface for a user such as a professional. The administrative interface may not have one or more of the tabs that are on the professional-user interface, and/or the administrative interface may include one or more additional tabs that do not appear on the professional-user interface. One such example additional tab is a profile-administration tab for conducting one or more of the above-described administrative functions. Another such example additional tab is a system-health-check tab for conducting functions such as validating technical information (e.g., server connectivity, database connectivity, system configuration, etc.) of the professional-team-builder system 202.

Figure 10:
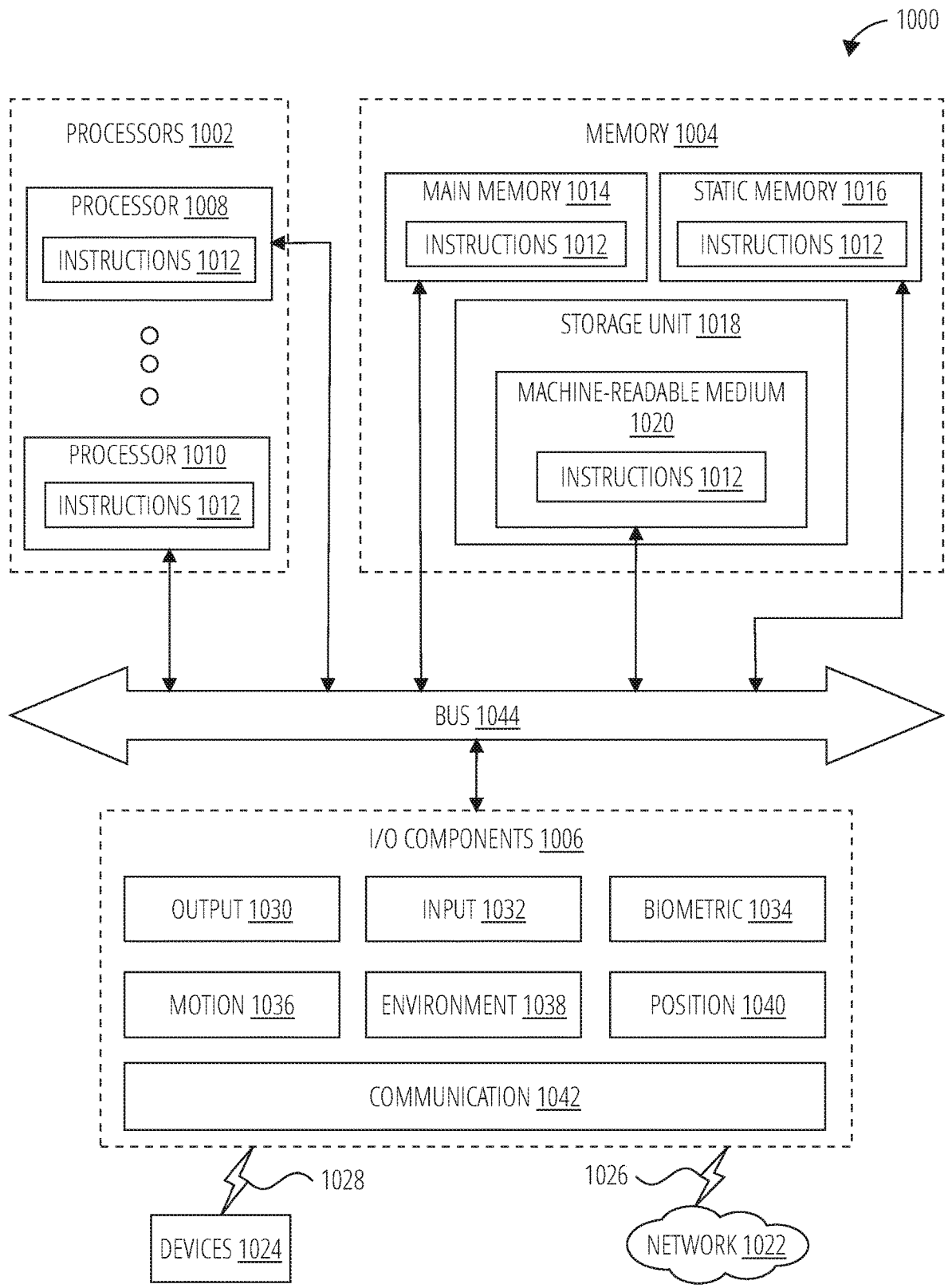
FIG. 10 illustrates an example computer system within which a set of instructions may be executed for causing the computer system to perform any one or more of the methodologies discussed herein.

FIG. 10 is a diagrammatic representation of a computer system 1000 within which instructions 1012 (e.g., software, a program, an application, an applet, an app, and/or other executable code) for causing the computer system 1000 to perform any one or more of the methodologies discussed herein may be executed. For example, the instructions 1012 may cause the computer system 1000 to execute any one or more of the methods described herein. The instructions 1012 transform the general, non-programmed computer system 1000 into a particular computer system 1000 programmed to carry out the described and illustrated functions in the manner described. The computer system 1000 may operate as a standalone device or may be coupled (e.g., networked) to other machines. In a networked deployment, the computer system 1000 may operate in the capacity of a server machine or a client machine in a server-client network environment, or as a peer machine in a peer-to-peer (or distributed) network environment. The computer system 1000 may be or include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 1012, sequentially or otherwise, that specify actions to be taken by the computer system 1000. Further, while only a single computer system 1000 is illustrated, the term "machine" shall also be taken to include a collection of machines that individually or jointly execute the instructions 1012 to perform any one or more of the methodologies discussed herein.

The computer system 1000 may include processors 1002, memory 1004, and I/O components 1006, which may be configured to communicate with each other via a bus 1044. In an example embodiment, the processors 1002 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 1008 and a processor 1010 that execute the instructions 1012. The term "processor" is intended to include multi-core processors that may include two or more independent processors (sometimes referred to as "cores") that may execute instructions contemporaneously. Although FIG. 10 shows multiple processors 1002, the computer system 1000 may include a single processor with a single core, a single processor with multiple cores (e.g., a multi-core processor), multiple processors with a single core, multiple processors with multiples cores, or any combination thereof.

The memory 1004 includes a main memory 1014, a static memory 1016, and a storage unit 1018, all accessible to the processors 1002 via the bus 1044. The memory 1004, the static memory 1016, and/or the storage unit 1018 may store the instructions 1012 embodying any one or more of the methodologies or functions described herein. The instructions 1012 may also or instead reside, completely or partially, within the main memory 1014, within the static memory 1016, within machine-readable medium 1020 within the storage unit 1018, within at least one of the processors 1002 (e.g., within the processor's cache memory), and/or any suitable combination thereof, during execution thereof by the computer system 1000.

The I/O components 1006 may include a wide variety of components to receive input, produce and/or provide output, transmit information, exchange information, capture measurements, and/or the like. The specific I/O components 1006 that are included in a particular instance of the computer system 1000 will depend on the type of machine. For example, portable machines such as mobile phones may include a touch input device or other such input mechanisms, while a headless server machine may not include such a touch input device. It will be appreciated that the I/O components 1006 may include many other components that are not shown in FIG. 10. In various example embodiments, the I/O components 1006 may include output components 1030 and input components 1032. The output components 1030 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 1032 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 1006 may include biometric components 1034, motion components 1036, environmental components 1038, and/or position components 1040, among a wide array of other components. For example, the biometric components 1034 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification, and/or the like), and/or the like. The motion components 1036 may include acceleration sensor components (e.g., an accelerometer), gravitation sensor components, rotation sensor components (e.g., a gyroscope), and so forth. The environmental components 1038 may include, for example, illumination sensor components (e.g., a photometer), temperature sensor components (e.g., one or more thermometers), humidity-sensor components, pressure-sensor components (e.g., a barometer), acoustic-sensor components (e.g., one or more microphones), proximity-sensor components (e.g., infrared sensors that detect nearby objects), gas sensors (e.g., gas-detection sensors to detection concentrations of hazardous gases for safety or to measure pollutants in the atmosphere), and/or other components that may provide indications, measurements, signals, and/or the like that correspond to a surrounding physical environment. The position components 1040 may include location-sensor components (e.g., a global positioning system (GPS) receiver), altitude-sensor components (e.g., altimeters or barometers that detect air pressure from which altitude may be derived), orientation-sensor components (e.g., magnetometers), and/or the like.

Communication may be implemented using a wide variety of technologies. The I/O components 1006 may further include communication components 1042 operable to communicatively couple the computer system 1000 to a network 1022 and/or devices 1024 via a coupling 1026 and/or a coupling 1028, respectively. For example, the communication components 1042 may include a network-interface component or another suitable device to interface with the network 1022. In further examples, the communication components 1042 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 1024 may include one or more other machines and/or any of a wide variety of peripheral devices (e.g., a peripheral device coupled via a universal serial bus (USB) connection).

Moreover, the communication components 1042 may detect identifiers or include components operable to detect identifiers. For example, the communication components 1042 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 1042, such as location via Internet Protocol (IP) geolocation, location via Wi-Fi signal triangulation, location via detecting an NFC beacon signal that may indicate a particular location, and/or the like.

One or more of the various memories (e.g., the memory 1004, the main memory 1014, the static memory 1016, and/or the memory of the processors 1002) and/or the storage unit 1018 may store one or more sets of instructions and data structures (e.g., software) embodying or used by any one or more of the methodologies or functions described herein. These instructions (e.g., the instructions 1012), when executed by processors 1002, cause various operations to implement the disclosed embodiments.

The instructions 1012 may be transmitted or received over the network 1022, using a transmission medium, via a network-interface device (e.g., a network-interface component included in the communication components 1042) and using any one of a number of well-known transfer protocols (e.g., the Session Initiation Protocol (SIP), the hypertext transfer protocol (HTTP), and/or the like). Similarly, the instructions 1012 may be transmitted or received using a transmission medium via the coupling 1028 (e.g., a peer-to-peer coupling) to the devices 1024.

Figure 11:
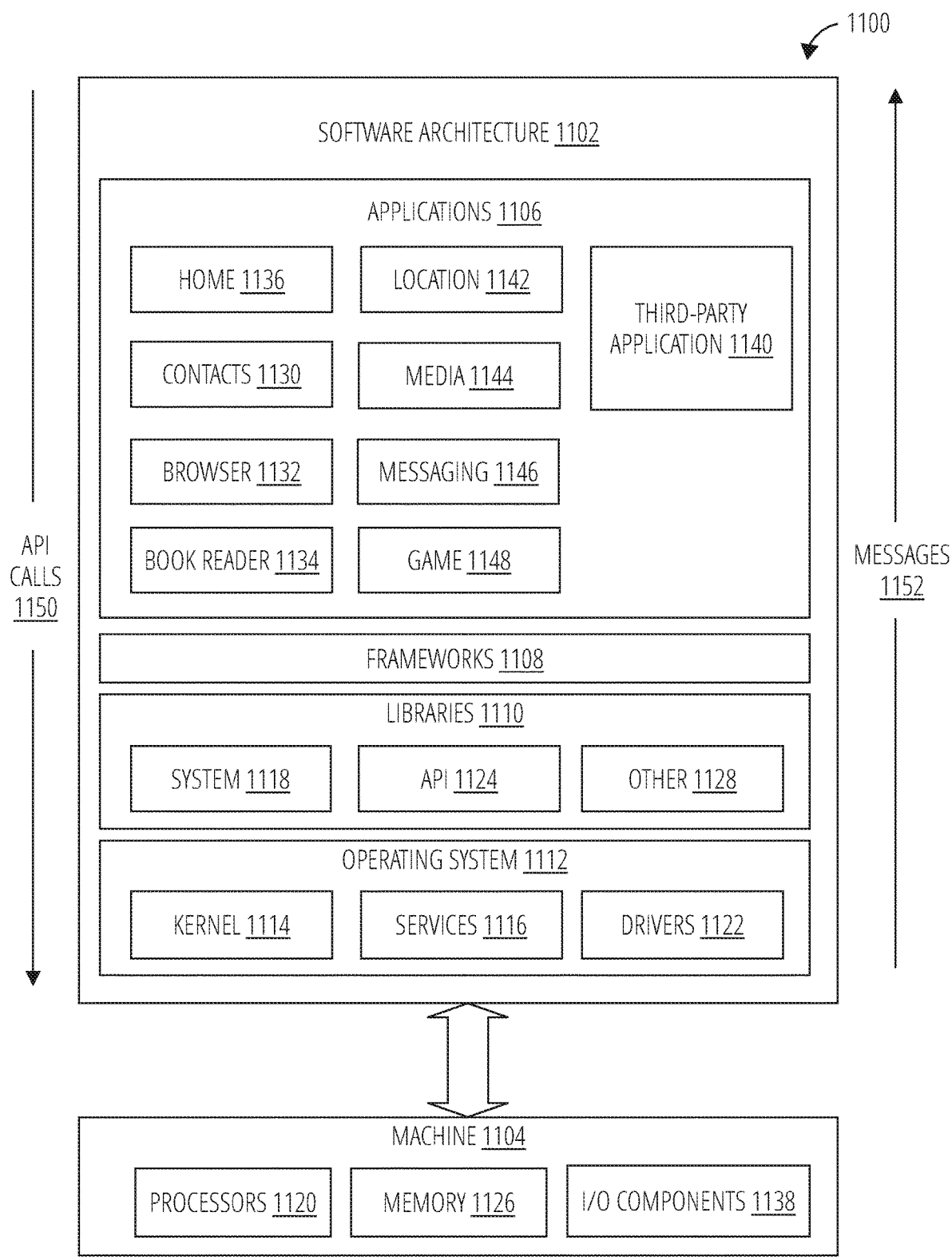
FIG. 11 illustrates an example software architecture within which one or more embodiments of the present disclosure may be implemented.

FIG. 11 is a block diagram 1100 illustrating a software architecture 1102, which can be installed on any one or more of the devices described herein. For example, the software architecture 1102 could be installed on any device or system that is arranged similar to the computer system 1000 of FIG. 10. The software architecture 1102 is supported by hardware such as a machine 1104 that includes processors 1120, memory 1126, and I/O components 1138. In this example, the software architecture 1102 can be conceptualized as a stack of layers, where each layer provides a particular functionality. The software architecture 1102 includes layers such an operating system 1112, libraries 1110, frameworks 1108, and applications 1106. Operationally, using one or more application programming interfaces (APIs), the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 may provide memory management, processor management (e.g., scheduling), component management, networking, and/or security settings, in some cases among other functionality. The services 1116 can provide other common services for the other software layers. The drivers 1122 are responsible for controlling or interfacing with the underlying hardware. For instance, the drivers 1122 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 1110 provide a low-level common infrastructure used by the applications 1106. The libraries 1110 can include system libraries 1118 (e.g., C standard library) that provide functions such as memory-allocation functions, string-manipulation functions, mathematic functions, and/or the like. In addition, the libraries 1110 can include API libraries 1124 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in a graphic content on a display), database libraries (e.g., SQLite to provide various relational-database functions), web libraries (e.g., WebKit to provide web-browsing functionality), and/or the like. The libraries 1110 can also include a wide variety of other libraries 1128 to provide many other APIs to the applications 1106.

The frameworks 1108 may provide a high-level common infrastructure that is used by the applications 1106. For example, the frameworks 1108 may provide various graphical user interface (GUI) functions, high-level resource management, high-level location services, and/or the like. The frameworks 1108 can provide a broad spectrum of other APIs that can be used by the applications 1106, some of which may be specific to a particular operating system or platform.

Purely as representative examples, the applications 1106 may include a home application 1136, a contacts application 1130, a browser application 1132, a book-reader application 1134, a location application 1142, a media application 1144, a messaging application 1146, a game application 1148, and/or a broad assortment of other applications generically represented in FIG. 11 by a third-party application 1140. The applications 1106 are programs that execute functions defined in the programs. Various programming languages can be employed to create one or more of the applications 1106, structured in a variety of manners, such as object-oriented programming languages (e.g., Objective-C, Java, C++, and/or the like), procedural programming languages (e.g., C, assembly language, and/or the like), and/or the like. In a specific example, the third-party application 1140 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 1140 can invoke the API calls 1150 provided by the operating system 1112 to facilitate functionality described herein.

Below is a listing of some examples of embodiments.

Example 1 is a method that includes: determining, by a professional-team-builder system that includes at least one hardware processor, whether a user of the professional-team-builder system is opted in or opted out for participation in a team-building function of the professional-team-builder system, the user being a team-building-eligible professional from among a plurality of team-building-eligible professionals; if the user is opted in, then: displaying, via a user interface of the professional-team-builder system, an opted-in interface, the opted-in interface including a search interface, the search interface including a plurality of search-criteria fields; receiving, via the search interface, a set of search-criteria input; retrieving, from data storage, at least one profile matching the set of search-criteria input, each retrieved profile corresponding to a potential teammate of the user for a professional-services team, each potential teammate being an opted-in and team-building-eligible professional from among the plurality of team-building-eligible professionals; and displaying, via the user interface, one or more of the at least one retrieved profile; and if the user is opted out, then displaying, via the user interface, an opted-out interface, the opted-out interface including a create-profile element, an update-profile element, and/or an opt-in element.

Example 2 is the method of Example 1, where each team-building-eligible professional in the plurality of team-building-eligible professionals is, as a default setting of the professional-team-builder system, initially opted out from participation in the team-building function of the professional-team-builder system.

Example 3 is the method of either Example 1 or Example 2, further including identifying the plurality of team-building-eligible professionals from a larger set of professionals based on team-building-eligibility criteria.

Example 4 is the method of any of the Examples 1-3, further including periodically auditing and updating the plurality of team-building-eligible professionals based on the team-building-eligibility criteria.

Example 5 is the method of either Example 3 or Example 4, where the team-building-eligibility criteria includes having created a profile on the professional-team-builder system.

Example 6 is the method of any of the Examples 3-5, where the team-building-eligibility criteria includes having an eligible job title.

Example 7 is the method of any of the Examples 1-6, where each retrieved profile is associated with a same geographic region as the user.

Example 8 is the method of any of the Examples 1-7, where each retrieved profile is associated with a same division of an organization as the user.

Example 9 is the method of any of the Examples 1-8, where each displayed profile includes contact information and job-title information for the corresponding potential teammate, each displayed profile further including one or more responses made by the corresponding potential teammate to the plurality of search-criteria fields.

Example 10 is the method of any of the Examples 1-9, further including receiving, via the user interface, an opt-out command with respect to the user, and responsively opting the user out of the team-building function of the professional-team-builder system, the opting out: disabling the search interface; and removing a profile of the user from being among a set of profiles that is searchable by the potential teammates.

Example 11 is the method of Example 10, further including, after the receiving of the opt-out command and the disabling of the search interface: persisting a profile of the user in the data storage; and receiving, via the user interface, an opt-in command associated with the user, and responsively: displaying the opted-in interface; and restoring the profile of the user to being searchable by the potential teammates.

Example 12 is the method of any of the Examples 1-11, where: the method further includes displaying, via the user interface, a plurality of togglable elements operable to show or hide respective profile elements, shown profile elements are searchable by, and displayed to, potential teammates of the user, and hidden profile elements are not searchable by, and not displayed to, potential teammates of the user.

Example 13 is the method of any of the Examples 1-12, further including: displaying, via the user interface, an administrative interface for an administrative user of the professional-team-builder system, the administrative interface including a plurality of togglable elements for controlling which fields do and do not appear on a create-profile interface, a review-and-update profile interface, and any displayed retrieved profiles.

Example 14 is the method of Example 13, where the administrative interface further includes a second plurality of togglable elements for controlling which fields can and cannot be hidden by users on their profiles.

Example 15 is the method of Example 14, further including alerting users if a given field that a user had selected to be hidden is set via the administrative interface as unable to be hidden.

Example 16 is the method of any of the Examples 13-15, where the administrative interface further includes at least one element for selectively disabling user profiles, the disabling of a user profile: opting that user out of the team-building function of the professional-team-builder system; and making that user profile not searchable by other users.

Example 17 is the method of any of the Examples 1-16, where the plurality of search-criteria fields on the search interface is specific to a division to which the user belongs among a plurality of divisions in an organization in which the user is a professional.

Example 18 is the method of any of the Examples 1-17, further including sending alerts in response to users opting in, users opting out, and/or users updating their profiles.

Example 19 is a professional-team-builder system that includes: a user interface; at least one hardware processor; and data storage that includes one or more non-transitory computer readable storage media containing instructions executable by the at least one hardware processor for causing the at least one hardware processor to perform operations including: determining whether a user of the professional-team-builder system is opted in or opted out for participation in a team-building function of the professional-team-builder system, the user being a team-building-eligible professional from among a plurality of team-building-eligible professionals; if the user is opted in, then: displaying, via the user interface, an opted-in interface, the opted-in interface including a search interface, the search interface including a plurality of search-criteria fields; receiving, via the search interface, a set of search-criteria input; retrieving, from the data storage, at least one profile matching the set of search-criteria input, each retrieved profile corresponding to a potential teammate of the user for a professional-services team, each potential teammate being an opted-in and team-building-eligible professional from among the plurality of team-building-eligible professionals; and displaying, via the user interface, one or more of the at least one retrieved profile; and if the user is opted out, then displaying, via the user interface, an opted-out interface, the opted-out interface including a create-profile element, an update-profile element, and/or an opt-in element.

Example 20 is one or more non-transitory computer readable storage media containing instructions executable by at least one hardware processor for causing the at least one hardware processor to perform operations including: determining, by a professional-team-builder system that includes at least one hardware processor, whether a user of the professional-team-builder system is opted in or opted out for participation in a team-building function of the professional-team-builder system, the user being a team-building-eligible professional from among a plurality of team-building-eligible professionals; if the user is opted in, then: displaying, via a user interface of the professional-team-builder system, an opted-in interface, the opted-in interface including a search interface, the search interface including a plurality of search-criteria fields; receiving, via the search interface, a set of search-criteria input; retrieving, from data storage, at least one profile matching the set of search-criteria input, each retrieved profile corresponding to a potential teammate of the user for a professional-services team, each potential teammate being an opted-in and team-building-eligible professional from among the plurality of team-building-eligible professionals; and displaying, via the user interface, one or more of the at least one retrieved profile; and if the user is opted out, then displaying, via the user interface, an opted-out interface, the opted-out interface including a create-profile element, an update-profile element, and/or an opt-in element.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A method comprising:
    determining, by a professional-team-builder system that comprises at last one hardware processor, whether a user of the professional-team-builder system is opted in or opted out for participation in a team-building function of the professional-team-builder system, the user being a team-building-eligible professional from among a plurality of team-building-eligible professionals;
    when the user is opted in, then:
        displaying, via a user interface of the professional-team-builder system, an opted-in interface, the opted-in interface comprising a search interface, the search interface comprising a plurality of search-criteria fields;
        receiving, via the search interface, a set of search-criteria input;
        retrieving, from data storage, at last one profile matching the set of search-criteria input, each retrieved profile corresponding to a potential teammate of the user for a professional-services team, each potential teammate being an opted-in and team-building-eligible professional from among the plurality of team-building-eligible professionals; and
        displaying, via the user interface, one or more of the at last one retrieved profile;
    displaying, via the user interface, an administrative interface for an administrative user of the professional-team-builder system, the administrative interface comprising:
        a first plurality of togglabe elements for controlling which fields do and do not appear on a create-profile interface, a review-and-update profile interface, and any displayed retrieved profiles; and
        a second plurality of togglabe elements for controlling which fields can and cannot be hidden by users on their profiles; and
    alerting users when a given field that a user had selected to be hidden is set via the administrative interface as unable to be hidden.

2. The method of claim 1, wherein each team-building-eligible professional in the plurality of team-building-eligible professionals is, as a default setting of the professional-team-builder system, initially opted out from participation in the team-building function of the professional-team-builder system.

3. The method of claim 1, further comprising identifying the plurality of team-building-eligible professionals from a larger set of professionals based on team-building-eligibility criteria.

4. The method of claim 3, further comprising periodically auditing and updating the plurality of team-building-eligible professionals based on the team-building-eligibility criteria.

5. The method of claim 3, wherein the team-building-eligibility criteria comprises having created a profile on the professional-team-builder system.

6. The method of claim 3, wherein the team-building-eligibility criteria comprises having an eligible job title.

7. The method of claim 1, wherein each retrieved profile is associated with a same geographic region as the user.

8. The method of claim 1, wherein each retrieved profile is associated with a same division of an organization as the user.

9. The method of claim 1, wherein each displayed profile comprises contact information and job-title information for the corresponding potential teammate, each displayed profile further comprising one or more responses made by the corresponding potential teammate to the plurality of search-criteria fields.

10. The method of claim 1, further comprising receiving, via the user interface, an opt-out command with respect to the user, and responsively opting the user out of the team-building function of the professional-team-builder system, the opting out:
    disabling the search interface; and
    removing a profile of the user from being among a set of profiles that is searchable by the potential teammates.

11. The method of claim 10, further comprising, after the receiving of the opt-out command and the disabling of the search interface:
    persisting a profile of the user in the data storage; and
    receiving, via the user interface, an opt-in command associated with the user, and responsively:
        displaying the opted-in interface; and
        restoring the profile of the user to being searchable by the potential teammates.

12. The method of claim 1, wherein:
the method further comprises displaying, via the user interface, a plurality of togglable elements operable to show or hide respective profile elements;
shown profile elements are searchable by, and displayed to, potential teammates of the user; and
hidden profile elements are not searchable by, and not displayed to, potential teammates of the user.

13. The method of claim 1, wherein the administrative interface further comprises at least one element for selectively disabling user profiles, the disabling of a user profile:
opting that user out of the team-building function of the professional-team-builder system; and
making that user profile not searchable by other users.

14. The method of claim 1, wherein the plurality of search-criteria fields on the search interface is specific to a division to which the user belongs among a plurality of divisions in an organization in which the user is a professional.

15. The method of claim 1, further comprising sending alerts in response to users opting in, users opting out, and/or users updating their profiles.

16. A professional-team-builder system comprising:
a user interface;
at last one hardware processor; and
data storage comprising one or more non-transitory computer readable storage media containing instructions executable by the at last one hardware processor for causing the at last one hardware processor to perform operations comprising:
determining whether a user of the professional-team-builder system is opted in or opted out for participation in a team-building function of the professional-team-builder system, the user being a team-building-eligible professional from among a plurality of team-building-eligible professionals;
when the user is opted in, then:
displaying, via the user interface, an opted-in interface, the opted-in interface comprising a search interface, the search interface comprising a plurality of search-criteria fields;
receiving, via the search interface, a set of search-criteria input;
retrieving, from the data storage, at last one profile matching the set of search-criteria input, each retrieved profile corresponding to a potential teammate of the user for a professional-services team, each potential teammate being an opted-in and team-building-eligible professional from among the plurality of team-building-eligible professionals; and displaying, via the user interface, one or more of the at last one retrieved profile;
displaying, via the user interface, an administrative interface for an administrative user of the professional-team-builder system, the administrative interface comprising:
a first plurality of togglabe elements for controlling which fields do and do not appear on a create-profile interface, a review-and-update profile interface, and any displayed retrieved profiles; and
a second plurality of togglabe elements for controlling which fields can and cannot be hidden by users on their profiles, and
alerting users when a given field that a user had selected to be hidden is set via the administrative interface as unable to be hidden.

17. One or more non-transitory computer readable storage media containing instructions executable by at last one hardware processor for causing the at last one hardware processor to perform operations comprising:
determining, by a professional-team-builder system that comprises at last one hardware processor, whether a user of the professional-team-builder system is opted in or opted out for participation in a team-building function of the professional-team-builder system, the user being a team-building-eligible professional from among a plurality of team-building-eligible professionals;
when the user is opted in, then:
displaying, via a user interface of the professional-team-builder system, an opted-in interface, the opted-in interface comprising a search interface, the search interface comprising a plurality of search-criteria fields;
receiving, via the search interface, a set of search-criteria input;
retrieving, from data storage, at last one profile matching the set of search-criteria input, each retrieved profile corresponding to a potential teammate of the user for a professional-services team, each potential teammate being an opted-in and team-building-eligible professional from among the plurality of team-building-eligible professionals; and
displaying, via the user interface, one or more of the at last one retrieved profile;
displaying, via the user interface, an administrative interface for an administrative user of the professional-team-builder system, the administrative interface comprising:
a first plurality of togglable elements for controlling which fields do and do not appear on a create-profile interface, a review-and-update profile interface, and any displayed retrieved profiles; and
a second plurality of togglable elements for controlling which fields can and cannot be hidden by users on their profiles; and
alerting users when a given field that a user had selected to be hidden is set via the administrative interface as unable to be hidden.

* * * * *

UNITED STATES PATENT AND TRADEMARK OFFICE
CERTIFICATE OF CORRECTION

PATENT NO. : 11,328,235 B1
APPLICATION NO. : 16/985867
DATED : May 10, 2022
INVENTOR(S) : Ta et al.

It is certified that error appears in the above-identified patent and that said Letters Patent is hereby corrected as shown below:

In the Claims

In Column 21, Line 48, in Claim 1, delete "last" and insert --least-- therefor

In Column 21, Line 63, in Claim 1, delete "last" and insert --least-- therefor

In Column 22, Line 4, in Claim 1, delete "last" and insert --least-- therefor

In Column 22, Line 9, in Claim 1, delete "togglabe" and insert --togglable-- therefor In Column 22, Line 13, in Claim 1, delete "togglabe" and insert --togglable-- therefor In Column 23, Line 24, in Claim 16, delete "last" and insert --least-- therefor In Column 23, Line 27, in Claim 16, delete "last" and insert --least-- therefor In Column 23, Line 28, in Claim 16, delete "last" and insert --least-- therefor In Column 23, Line 43, in Claim 16, delete "last" and insert --least-- therefor In Column 23, Line 51, in Claim 16, delete "last" and insert --least-- therefor In Column 24, Line 1, in Claim 16, delete "togglabe" and insert --togglable-- therefor In Column 24, Line 6, in Claim 16, delete "togglabe" and insert --togglable-- therefor In Column 24, Line 13, in Claim 17, delete "last" and insert --least-- therefor In Column 24, Line 14, in Claim 17, delete "last" and insert --least-- therefor Signed and Sealed this
Twelfth Day of July, 2022

Katherine Kelly Vidal
*Director of the United States Patent and Trademark Office*

CERTIFICATE OF CORRECTION (continued)
U.S. Pat. No. 11,328,235 B1

In Column 24, Line 17, in Claim 17, delete "last" and insert --least-- therefor

In Column 24, Line 32, in Claim 17, delete "last" and insert --least-- therefor

In Column 24, Line 40, in Claim 17, delete "last" and insert --least-- therefor